United States Patent

Gotoh et al.

[11] Patent Number: 5,148,997
[45] Date of Patent: Sep. 22, 1992

[54] SLAG CRUSHING DEVICE

[75] Inventors: Kazushi Gotoh, Kameyama; Toshio Nakanishi, Koyama, both of Japan

[73] Assignee: Kabushiki Kaisha Daiki Aluminum Kogyosho, Osaka, Japan

[21] Appl. No.: 672,982

[22] Filed: Mar. 21, 1991

[30] Foreign Application Priority Data

Sep. 28, 1990 [JP] Japan .................. 2-261436

[51] Int. Cl.⁵ .................................. B02C 17/04
[52] U.S. Cl. ............................ 241/65; 241/228; 241/299
[58] Field of Search ............... 241/228, 299, 65

[56] References Cited

U.S. PATENT DOCUMENTS

| | | | |
|---|---|---|---|
| 1,064,680 | 6/1913 | Bartley | 241/228 |
| 1,428,687 | 9/1922 | Ferencz | 241/228 |
| 4,480,797 | 11/1984 | Weiss | 241/65 |

FOREIGN PATENT DOCUMENTS

| | | | |
|---|---|---|---|
| 0100990 | 9/1978 | Japan | 241/65 |
| 87632 | 10/1936 | Sweden | 241/116 |
| 1538930 | 1/1990 | U.S.S.R. | 241/65 |

Primary Examiner—Mark Rosenbaum
Assistant Examiner—John M. Husar
Attorney, Agent, or Firm—Edwin E. Greigg; Ronald E. Greigg

[57] ABSTRACT

In a slag crushing device according to the present invention, a cylindrical body having a slag insertion port in its one end and a discharge port in the other end is rotatably provided around a shaft center so inclined that the position of the discharge port is below the position of the slag insertion port. At least one crushing annular body having a smaller radius than that of the cylindrical body and idled parallel with the shaft center of the cylindrical body is arranged inside of the above cylindrical body. This crushing annular body is guided by a guide frame provided on the inner periphery of the cylindrical body. The guide frame is provided with apertures for introducing slag into the crushing annular body and apertures for discharging the slag crushed.

14 Claims, 6 Drawing Sheets

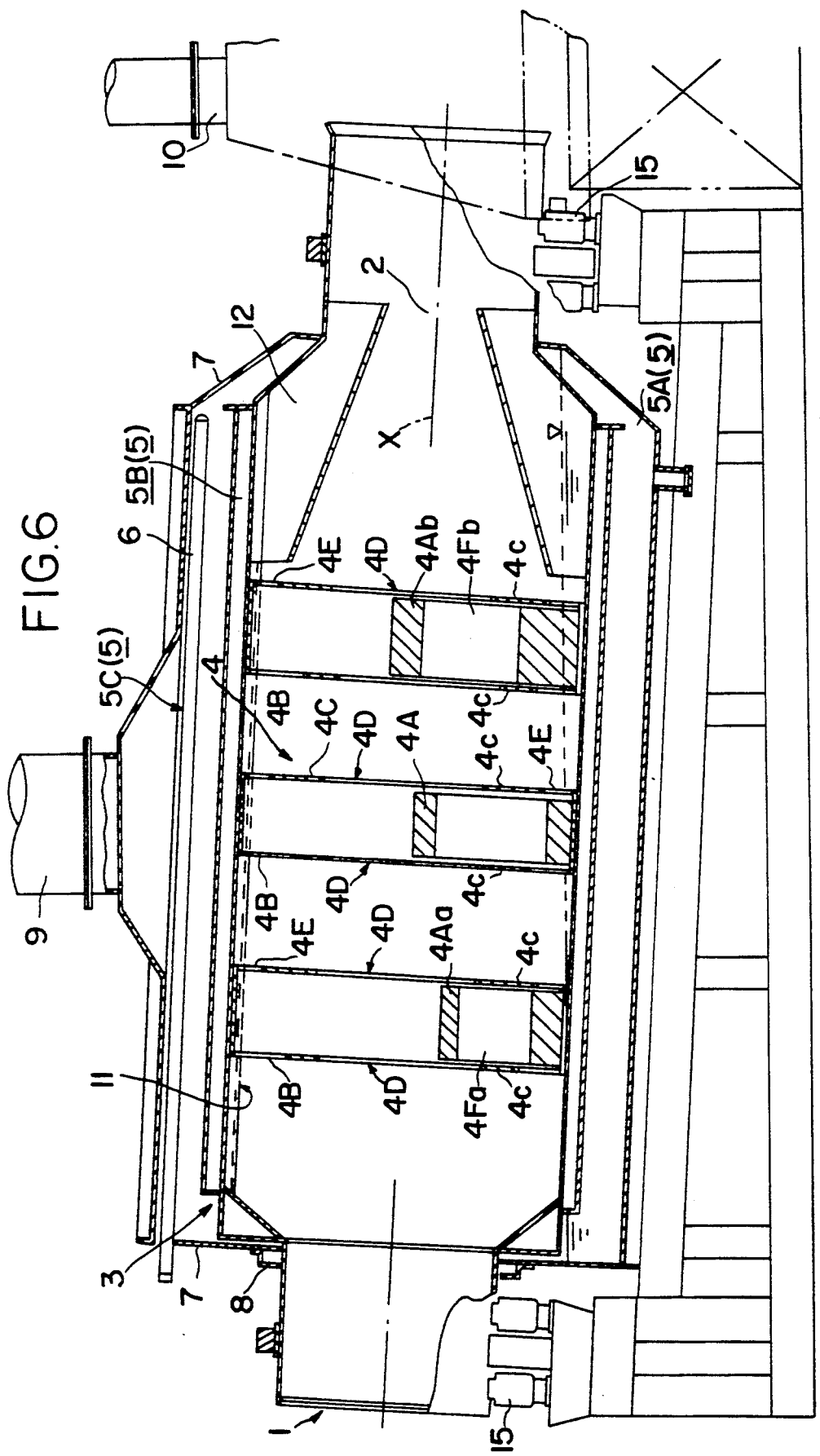

SLAG CRUSHING DEVICE

BACKGROUND OF THE INVENTION

1. Field of the Invention

The present invention relates to an epoch-making slag crushing device whose length can be reduced, when slag formed in melting aluminum or an aluminum alloy is processed, by mainly crushing the slag and additionally cooling the slag effectively.

2. Description of the Prior Art

When an ingot or a block of aluminum or an aluminum alloy is melted by, for example, a melting and holding furnace, a contained metal other than aluminum or an oxide floats up on molten aluminum as slag. Since this slag still contains separable metallic aluminum in large quantities, the slag is first squeezed through the squeezing process referred to as dross squeezing and the metallic aluminum thus obtained is directly introduced into the melting and holding furnace to recover the aluminum.

However, a thermic reaction occurs in part of the slag squeezed through the above described dross squeezing. The larger a mass of slag is, the higher the temperature of the inside of the mass is (2000° C. to 3000° C.). If the mass is left as it is, the mass and surrounding small masses of slag coalesce to increasingly grow into a large mass of slag. Consequently, the above described thermit reaction is promoted so that the large mass of slag is hotter, contributing to a fire, for example, which is very dangerous.

In order to restrain the thermit reaction, the above described slag may be cooled. Even if the surface of the large mass of slag is merely cooled, however, it is difficult to reduce the temperature of the inside of the mass of slag.

Furthermore, even if the slag is squeezed through the dross squeezing, aluminum is, in fact, still contained in the slag. Accordingly, there has been a demand for effective recovery of this aluminum.

Additionally, besides separating the aluminum from the slag, it is also necessary to crush the slag to separate a reusable contained metal or a reusable oxide from the slag and then, discard the same.

SUMMARY OF THE INVENTION

A first object of the present invention is to provide a slag crushing device for taking out hot slag which is formed at the time of melting a metal and squeezing the slag through dross squeezing and then, efficiently crushing the same.

A second object of the present invention is to reduce the total length of a slag crushing device by effectively cooling slag decreased in size by crushing.

In order to solve the above described first object, that is, crushing of slag, in a slag crushing device according to the present invention, an approximately cylindrical body having a slag insertion port in its end and a discharge port in the other end is rotatably provided around a shaft center so inclined that the position of the above discharge port is below the position of the above slag insertion port, and a slag crushing portion is provided inside of the cylindrical body, the slag crushing portion comprising at least one crushing annular body having a smaller radius than that of the cylindrical body and provided parallel with the shaft center of the cylindrical body such that it can be idled and a guide frame for guiding the crushing annular body and having apertures for introducing slag into the crushing annular body.

By using the slag crushing device according to the present invention, slag which has been taken out of a furnace after melting and has been squeezed through dross squeezing can be crushed to small sizes by the crushing annular body. Accordingly, adjacent masses of hot slag can be prevented from coalescing to grow into a hotter mass of slag, thereby making it possible to enhance the safety of the slag crushing device. Consequently, the components of the slag can be separated into one for a metal and one for an oxide, thereby to make it possible to efficiently recover a useful metal or a useful oxide.

Furthermore, in order to attain the second object, that is, cooling, the slag crushing device according to the present invention is provided with a cooling water tank in which the lower part of the cylindrical body is immersed. This cooling water tank makes it possible to automatically cool the entire peripheral surface of the cylindrical body as it is rotated with crushing to reduce the total length of the slag crushing device. Moreover, in order to achieve the second object, that is, cooling more satisfactorily, in the slag crushing device according to the present invention, paddles having a predetermined length in the direction of the shaft center of the cylindrical body are provided on the outer peripheral surface of the cylindrical body with predetermined spacing in the peripheral direction, the paddles being so constructed that cooling water in the above cooling water tank is scooped up by the rotation of the above cylindrical body and is held to an upper dead center in the direction of rotation and the cooling water is held from the upper dead center in the direction of rotation to a lower dead center in the direction of rotation, and cooling water supplying means, such as water supplying pipes, for supplying cooling water to the above paddles is provided above the above cylindrical body.

The paddles provided on the outer peripheral surface of the above cylindrical body and the cooling water supplying means provided above the cylindrical body are thus added to the above described cooling means using only the cooling water tank, thereby to make it possible for the cooling water to continue to also cool the entire slag crushing device after leaving the cooling water tank. Accordingly, the cooling effect can be enhanced more significantly than before.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a vertical sectional view showing the whole of a slag crushing device according to a third embodiment of the present invention.

DESCRIPTION OF THE PREFERRED EMBODIMENTS

A slag crushing device according to one embodiment of the present invention will be described in detail around cooling and crushing of aluminum slag with reference to FIGS. 1 to 3.

Figure 1:
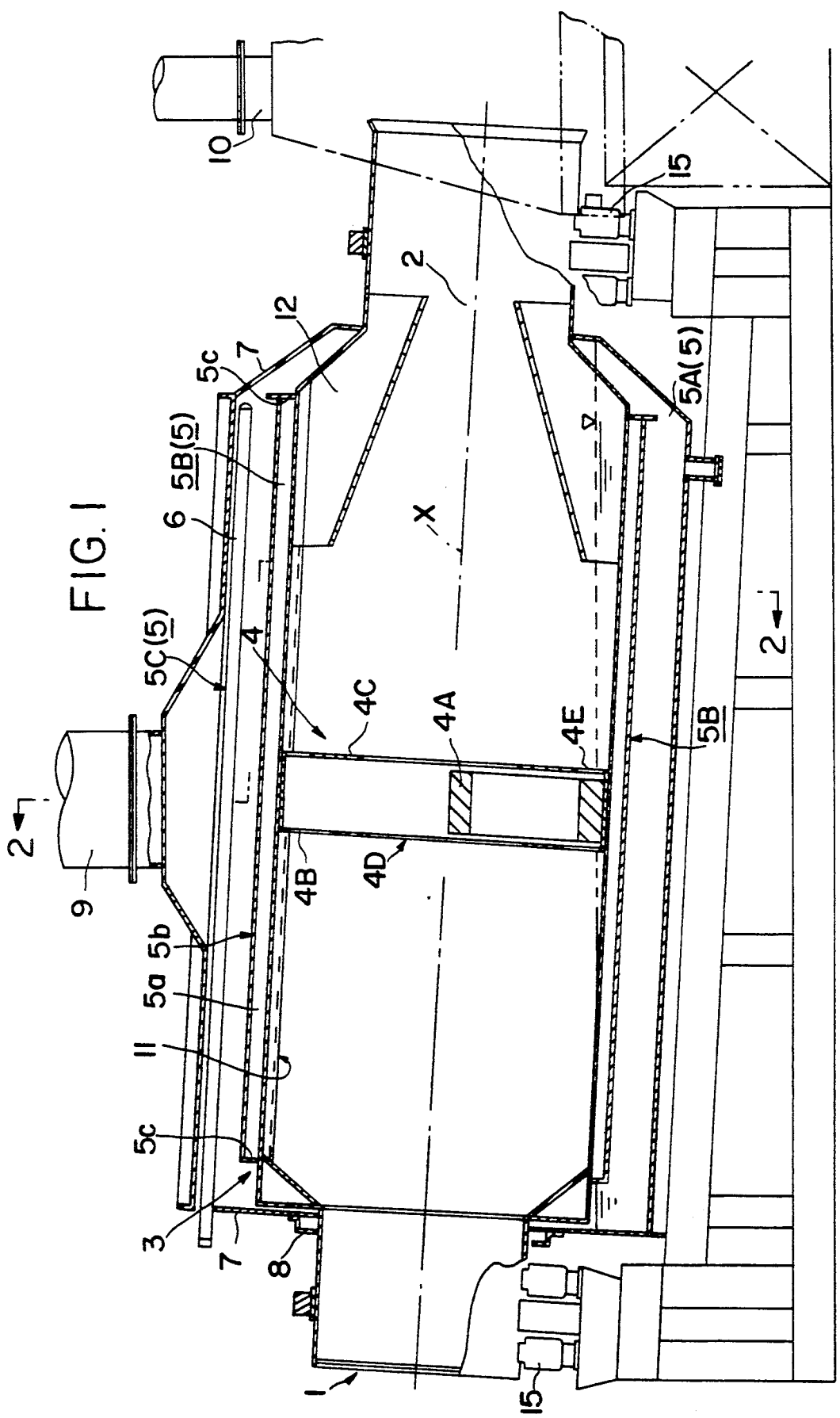
FIG. 1 is a vertical sectional view showing the whole of a slag crushing device according to a first embodiment of the present invention.
Figure 2:
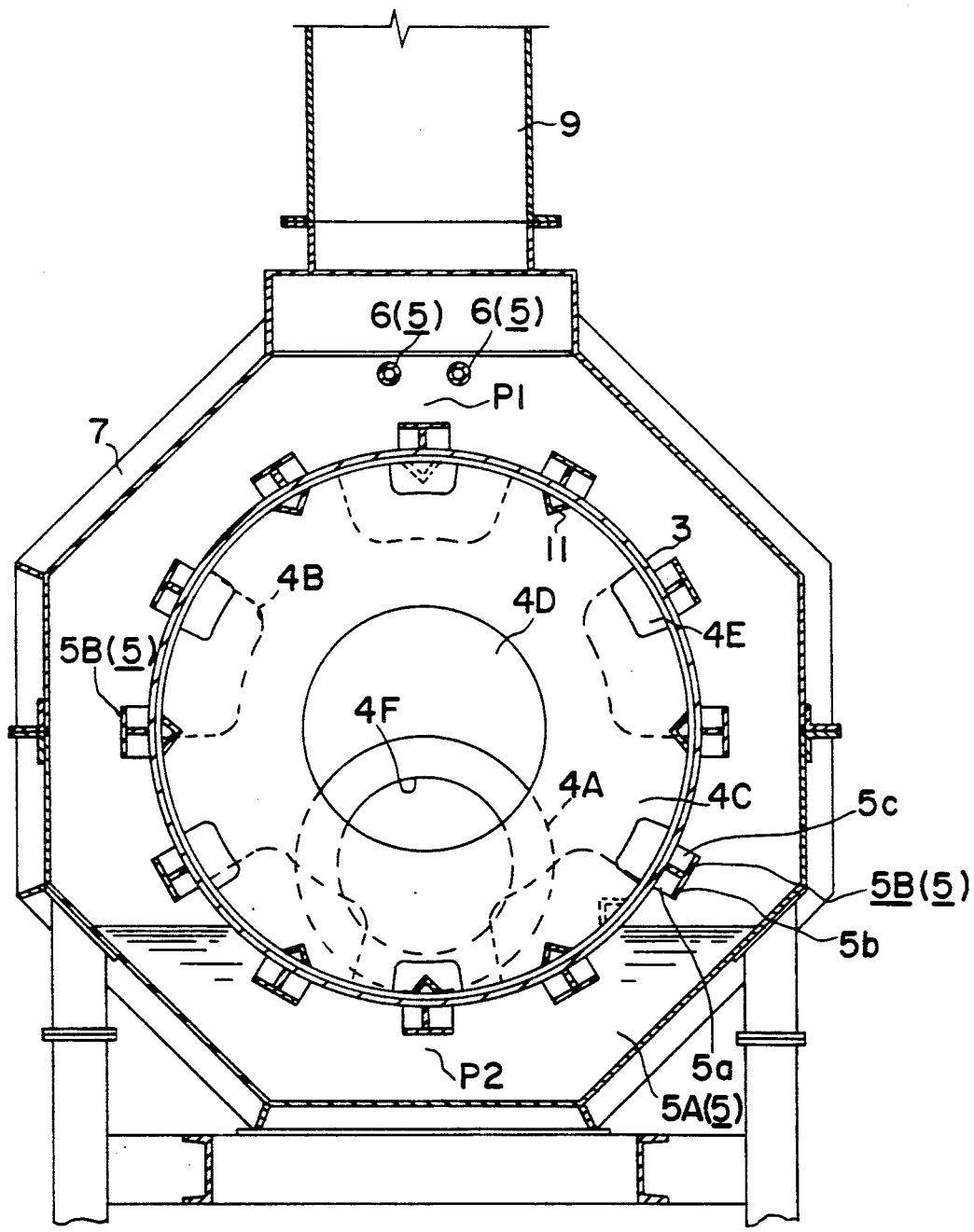
FIG. 2 is a sectional perspective view taken along a line 2—2 shown in FIG. 1.
Figure 3:
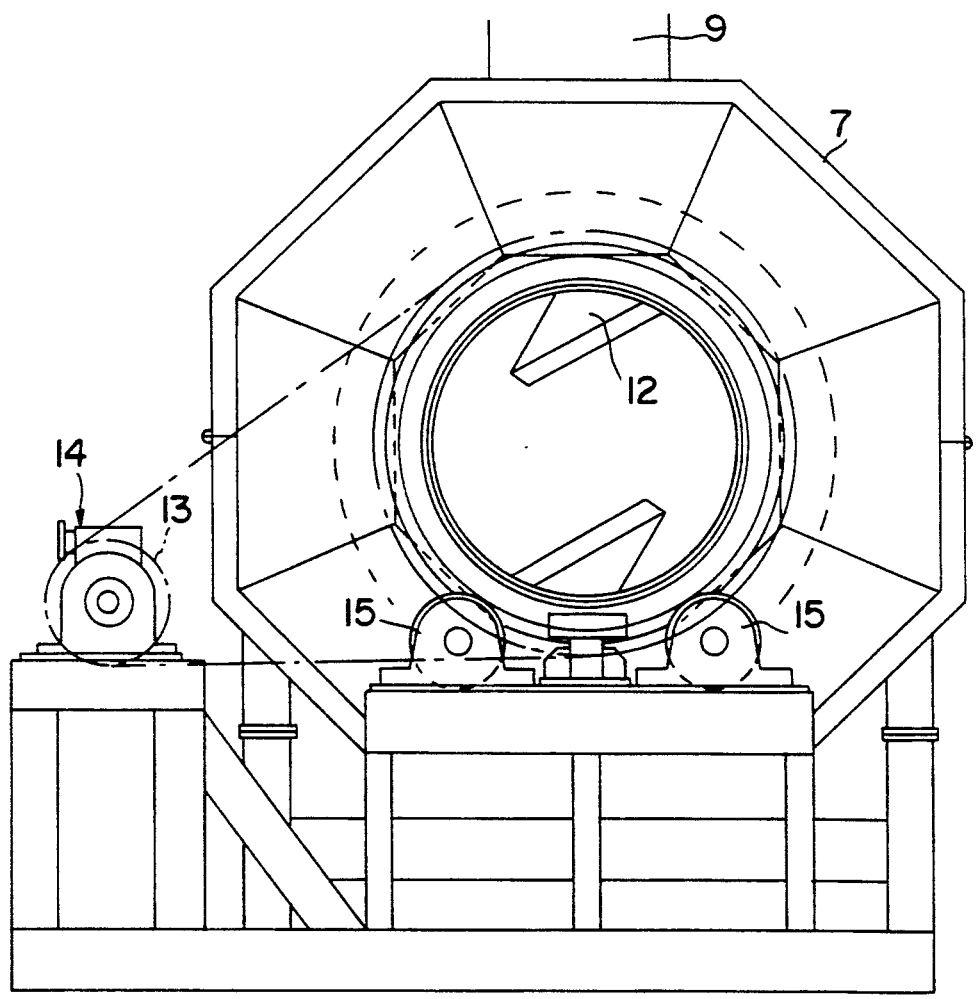
FIG. 3 is a rear elevation view showing the slag crushing device.

As shown in FIGS. 1 to 3, an approximately cylindrical body 3 having a slag insertion port 1 in its one end and a discharge port 2 in the other end is rotatably provided through a roller around a shaft center X so inclined that the position of the above discharge port 2 is below the position of the above slag insertion port 1 so as to receive aluminum slag from a dross squeezing device (not shown). Inside of the cylindrical body 3, a slag crushing portion 4 is provided around the central position in the direction of the shaft center X.

The slag crushing portion 4 has a smaller radius than that of the cylindrical body 3, and comprises one crushing annular body 4A provided parallel with the shaft center X of the above cylindrical body such that it can be idled and a guide frame 4C for guiding the crushing annular body 4A and having apertures 4B and 4D for introducing slag into the crushing annular body 4A.

The above crushing annular body 4A is made of cast iron in a ring shape. The diameter of the crushing annular body 4A is made smaller than the radius of the above cylindrical body 3. The weight of the crushing annular body 4A is set to approximately 500 kg so as to considerably produce the crushing effect.

In the embodiment shown in FIGS. 1 and 3, the above guide frame 4C is constituted by two disc-shaped bodies so as to sandwich the above crushing annular body 4A therebetween as viewed in vertical section on the inner periphery in the center of the above cylindrical body 3. A central aperture 4D penetrating through the disc-shaped bodies in the direction of the shaft center X of the cylindrical body 3 is provided in the central parts of the disc-shaped bodies, and five inlet apertures 4B and six outlet apertures 4E are provided with predetermined spacing in the outer peripheral portions of the disc-shaped bodies. The width of the inlet apertures 4B is large, while the width of the outlet apertures 4E is small, to make it easy for the slag to enter the guide frame 4C as well as to make it difficult for the slag to go out of the guide frame 4C. Consequently, the slag is considerably crushed.

In the embodiment shown in FIGS. 1 to 3, cooling means 5 for cooling the above cylindrical body 3 is provided outside of the cylindrical body 3. (Since slag other than the aluminum slag is only crushed, the cooling means may, in some cases, be required.) This cooling means 5 comprises a cooling water tank 5A in which the lower part of the cylindrical body 3 is immersed, paddles 5B provided on the outer peripheral surface of the cylindrical body 3 with predetermined spacing in the peripheral direction and having a predetermined length in the direction of the shaft center X, and cooling water supplying means 5C.

The paddles 5B are so constructed that cooling water in the above cooling water tank 5A is scooped up by the above cylindrical body 3 and is held to an upper dead center P1 in the direction of rotation and the cooling water is held from the upper dead center P1 in the direction of rotation to a lower dead center P2 in the direction of rotation. More specifically, as obvious from FIG. 2, each of the paddles 5B comprises a longitudinal rib 5a projected parallel with the shaft center X and radially, a horizontal rib 5b horizontally attached to the side of the longitudinal rib 5a, and end ribs 5c and 5c for closing apertures on both sides of the longitudinal rib 5a and the horizontal rib 5b, and has a structure like a water wheel in which a gutter is laid on the outer periphery of the cylindrical body 3.

The cooling water supplying means 5C provided above the above cylindrical body 3 is so constructed that a pipe 6 arranged above the cylindrical body 3 along the direction of the shaft center X thereof is provided with a lot of holes so as to supply cooling water to said paddles 5B, to make it possible to shower the paddles 5B.

A cover 7 for substantially covering the above cylindrical body 3 is provided through a seal 8 so as to allow the cylindrical body 3 to rotate. This cover 7 is octagonal as viewed from the front perpendicularly intersecting the shaft center X of the cylindrical body 3.

A steam duct 9 is connected to the cover 7, and a steam generator (not shown) is connected to the steam duct 9.

A dust collecting duct 10 is provided on the side of the discharge port 2 of the above cylindrical body 3. A known suction fan and its driving means (not shown) are connected to the dust collecting duct 10.

A plurality of projections 11 for lifting the slag along the inner periphery of the above cylindrical body 3 as the cylindrical body 3 rotates are provided inside of the cylindrical body 3.

12 denotes a propeller fan provided close to the discharge port 2 inside of the above cylindrical body 3 for driving the slag to discharge the same from the discharge port 2.

13 denotes an electric motor for driving the above cylindrical body 3 to rotate, and 14 denotes variable driving transferring means of the electric motor 13, which comprises a speed reducer and an endless belt.

15 denotes a pair of rollers, through which the above cylindrical body is rotatably provided around the shaft center.

Figure 4:
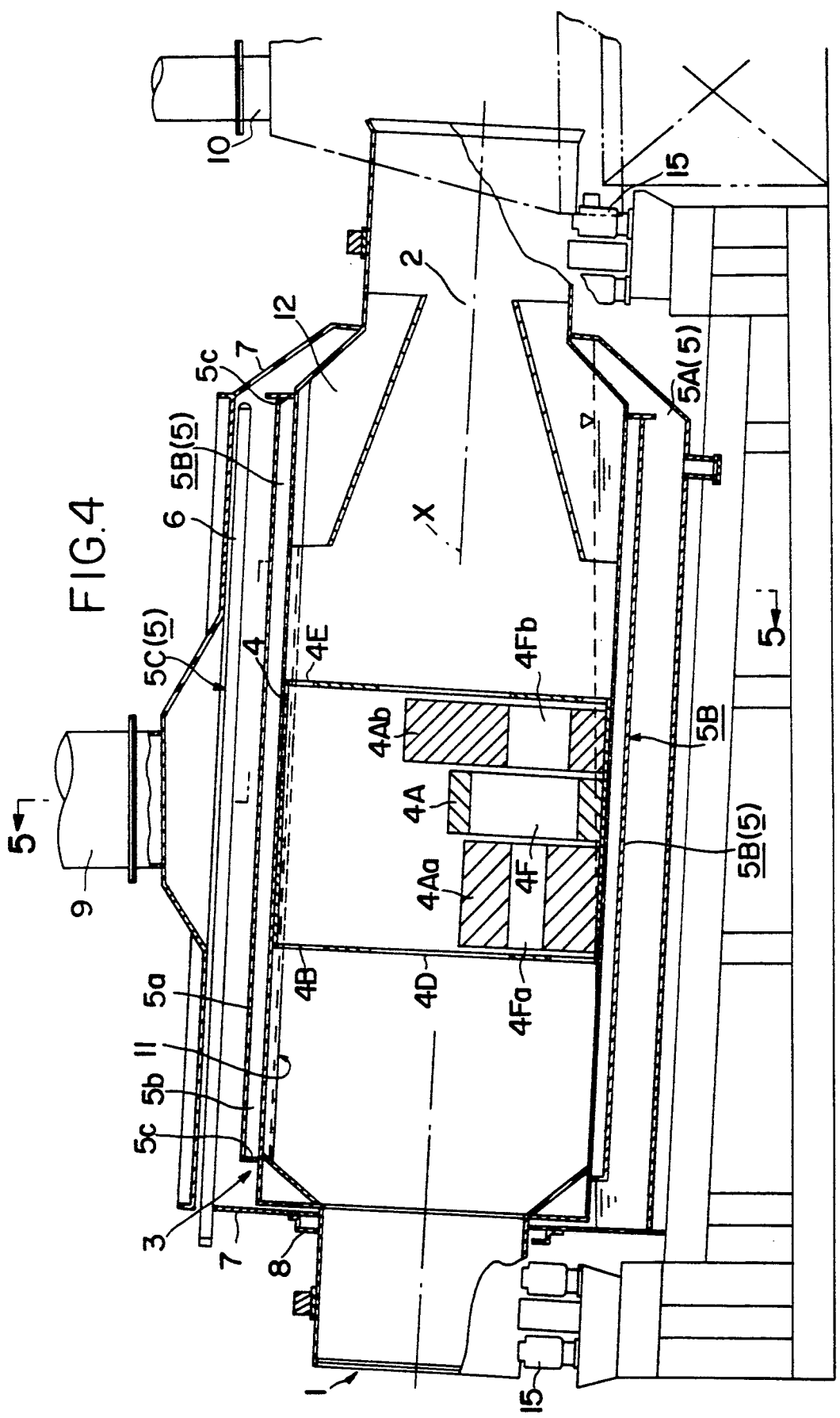
FIG. 4 is a vertical sectional view showing the whole of a slag crushing device according to a second embodiment of the present invention.
Figure 5:
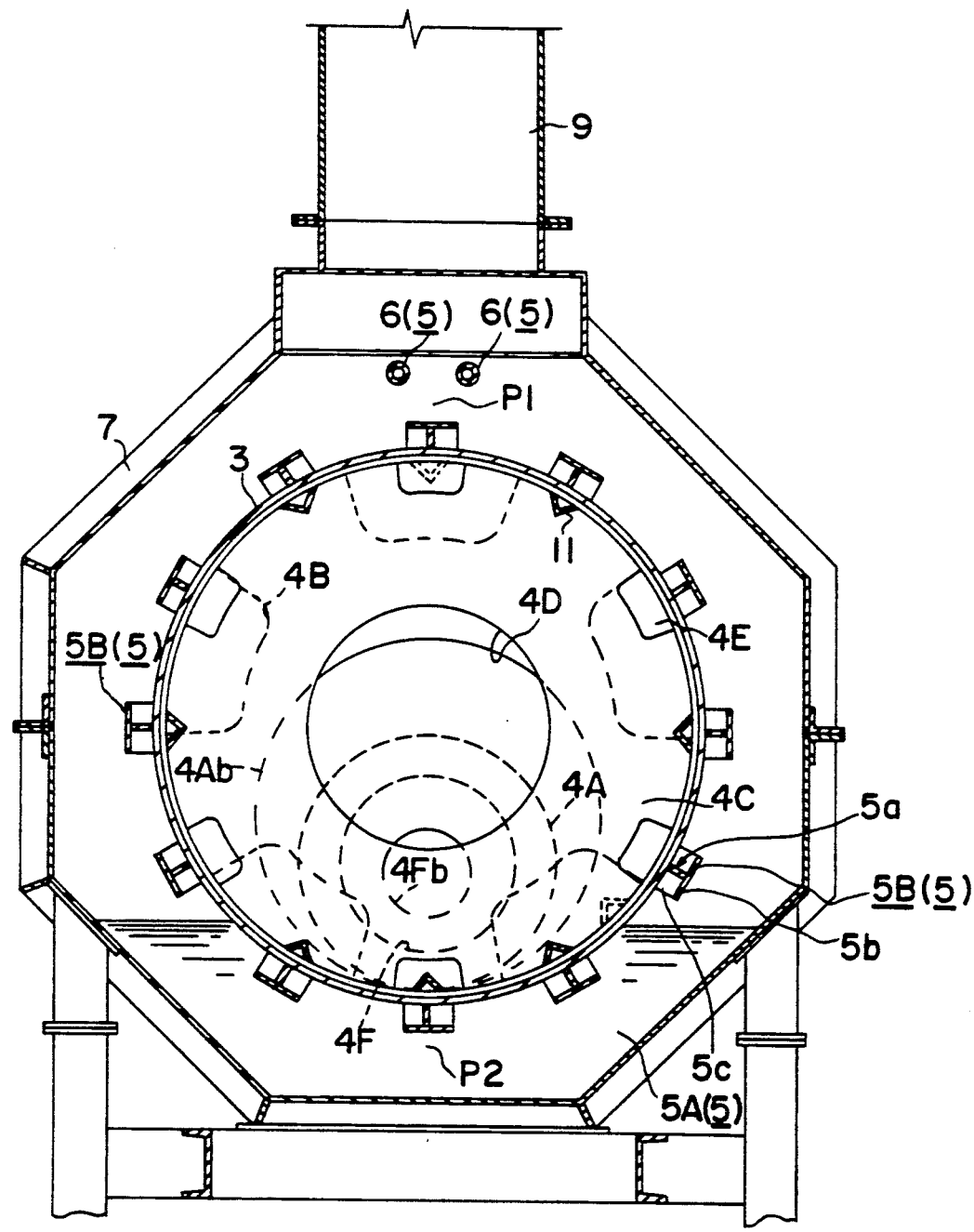
FIG. 5 is a sectional perspective view taken along a line 5—5 shown in FIG. 4.

FIGS. 4 and 5 are diagrams showing a slag crushing device according to a second embodiment of the present invention, in which a plurality of crushing annular bodies 4A, 4Aa, 4Ab, . . . are contained within one guide frame 4C.

In the embodiment shown in FIGS. 4 and 5, through holes 4F, 4Fa, 4Fb, . . . respectively provided for the crushing annular bodies 4A, 4Aa, 4Ab, . . . are different in position and the crushing annular bodies 4A, 4Aa, 4Ab, . . . are different in rotating conditions, thereby to effectively crush slag.

FIG. 6 is a diagram showing a slag crushing device according to a third embodiment of the present invention, in which a plurality of guide frames 4C are provided, thereby to improve crushing efficiency.

Although in the above embodiments, description was made around cooling and crushing of aluminum slag, it should be noted that the present invention is not limited to the same. For example, the present invention can be applied to crushing of usual slag or the like.

Furthermore, the paddles 5B which are provided on the outer periphery of the above cylindrical body 3 may be inclined with respect to the inclined shaft center X of the cylindrical body 3 so as to be parallel to the setting level, that is, to perpendicularly intersect the vertical direction, thereby to prevent cooling water supplied from above from immediately flowing along the outer surface of the inclined cylindrical body 3 to enhance cooling efficiency (not shown).

Furthermore, the paddles 5B may be provided with weirs perpendicularly intersecting the shaft center X of the cylindrical body 3 with suitable spacing, thereby to prevent cooling water from easily flowing along the outer surface of the inclined cylindrical body 3 (not shown).

In the slag crushing device constructed as described above, the slag inserted from the slag insertion port 1 leads to the slag crushing portion 4 while being subjected to the rotating action in the rotating cylindrical body 3. In this slag crushing portion 4, the slag enters the guide frame 4C having the apertures 4B and 4D for introducing the slag into the crushing annular body 4A. In this guide frame 4C, the slag is compressed to be crushed between the lower surface of the crushing annular body 4A which is relatively rotated freely as the cylindrical body 3 rotates and the inner wall of the cylindrical body 3. Consequently, the slag is crushed to small sizes. In the case of the above described aluminum slag, thermit reaction is restrained by crushing to small sizes. At the same time, when the outer peripheral wall of the above cylindrical body 3 is cooled by the cooling water tank 5A provided below the above cylindrical body 3, the temperature of the slag crushed to small sizes is reduced more rapidly, thereby to make it possible to reliably restrain the thermit reaction.

The above crushing annular body 4A is guided by the guide frame 4C and is only relatively rotated by the weight of the crushing annular body 4A as the above cylindrical body 3 rotates, and is not directly coupled to means for driving the annular crushing body 4A. Accordingly, there is little possibility of causing failures due to, for example, the effect of temperature as means for crushing hot slag.

Meanwhile, in the present invention, slag crushing portions 4 as described above may be provided in a plurality of positions with predetermined spacing in the direction of the shaft center X of the above cylindrical body 3.

Furthermore, although the above crushing annular body 4A is preferably in a ring shape, it may be in a roller shape, a ball shape or such a shape that it is rotatable even if its peripheral surface is irregular.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A slag crushing device, comprising a substantially cylindrical body having a slag insertion port in its one end and a discharge port in the other end, said cylindrical body is rotatably provided around a shaft center so inclined that the position of said discharge port is below the position of said slag insertion port, and a slag crushing portion is provided inside of said cylindrical body, the slag crushing portion comprising at least one guide frame (4C) including spaced disc-shaped bodies secured within said cylindrical body, at least one annular crushing body within said at least one guide frame, said at least one annular crushing body having a smaller radius than that of the cylindrical body and provided with an axis parallel with the shaft center of the cylindrical body such that said at least one annular crushing body can be idled, and said at least one guide frame for guiding said at least one annular crushing body having at least one inlet aperture (4B) for introducing slag into the at least one guide frame to be crushed by said at least one annular crushing body, at least one outlet aperture (4E) through which the crushed slag leaves said at least one guide frame for being transported to said discharge port, and the inlet apertures (4B) are larger than said outlet apertures (4E).

2. The slag crushing device according to claim 1, wherein there is provided a cooling water tank which surrounds said cylindrical body in which the lower part of the cylindrical body is immersed.

3. The slag crushing device according to claim 2, wherein paddles having a predetermined length in the direction of the shaft center are provided on the outer peripheral surface of the cylindrical body with predetermined spacing in the peripheral direction, the paddles being so constructed that cooling water in said cooling water tank is scooped up by the rotation of said cylindrical body and held to an upper dead center in the direction of rotation and the cooling water is held from the upper dead center in the direction of rotation to a lower dead center in the direction of rotation, and cooling water supplying means for supplying cooling water to said paddles is provided above said cylindrical body.

4. A slag crushing device as set forth in claim 2 in which there are a plurality of inlet apertures and a plurality of outlet apertures.

5. A slag crushing device as set forth in claim 1, in which there is more than one annular crushing body.

6. A slag crushing device according to claim 5, wherein there is provided a cooling water tank which surrounds said cylindrical body in which the lower part of the cylindrical body is immersed.

7. A slag crushing device as set forth in claim 6 wherein said annular crushing bodies are of different diameters.

8. A slag crushing device as set forth in claim 6 wherein there is more than one guide frame, and said more than one guide frame separates each of said more than one annular crushing bodies.

9. The slag crushing device according to claim 6, wherein paddles having a predetermined length in the direction of the shaft center are provided on the outer peripheral surface of the cylindrical body with predetermined spacing in the peripheral direction, the paddles being so constructed that cooling water in said cooling water tank is scooped up by the rotation of said cylindrical body and held to an upper dead center in the direction of rotation and the cooling water is held from the upper dead center in the direction of rotation to a lower dead center in the direction of rotation, and cooling water supplying means for supplying cooling water to said paddles is provided above said cylindrical body.

10. A slag crushing device as set forth in claim 4 wherein said annular crushing bodies are of different diameters.

11. A slag crushing device as set forth in claim 4 wherein there is more than one guide frame, and said more than one guide frame separates each of said more than one annular crushing bodies.

12. A slag crushing device as set forth in claim 5 wherein said annular crushing bodies are of different diameters.

13. A slag crushing device as set forth in claim 5 wherein there is more than one guide frame, and said more than one guide frame separates each of said more than one annular crushing bodies.

14. A slag crushing device as set forth in claim 1 in which there are a plurality of inlet apertures and a plurality of outlet apertures.

* * * * *